United States Patent [19]

Ito et al.

[11] Patent Number: 4,525,825
[45] Date of Patent: Jun. 25, 1985

[54] METHOD AND APPARATUS FOR DETECTING FOCUSSING AND TRACKING ERROR SIGNALS

[75] Inventors: Kenichi Ito; Tohru Musha; Kiichi Kato; Kimiaki Yamamoto, all of Hachioji, Japan

[73] Assignee: Olympus Optical Co., Ltd., Japan

[21] Appl. No.: 309,402

[22] Filed: Oct. 7, 1981

[30] Foreign Application Priority Data

Oct. 9, 1980 [JP] Japan .................. 55-141174

[51] Int. Cl.³ .............................. G11B 7/08
[52] U.S. Cl. ........................ 369/45; 369/46; 369/109; 369/110
[58] Field of Search ................ 369/43–45, 369/32–33, 41, 109–112; 250/201–202, 204

[56] References Cited

U.S. PATENT DOCUMENTS

| T953,002 | 12/1976 | Firester | 369/109 |
|---|---|---|---|
| 3,962,721 | 6/1976 | de Haan | 369/46 |
| 4,037,929 | 7/1977 | Bricot et al. | 369/46 |
| 4,051,527 | 9/1977 | Braat | 369/46 |
| 4,059,841 | 11/1977 | Bricot et al. | 369/46 |
| 4,163,149 | 7/1979 | Swano et al. | 369/45 |
| 4,293,944 | 10/1981 | Izumita et al. | 369/46 |
| 4,334,300 | 6/1982 | Arquie et al. | 369/112 |
| 4,358,200 | 11/1982 | Heemskerk et al. | 369/45 |
| 4,390,781 | 6/1983 | Musha | 369/45 |

FOREIGN PATENT DOCUMENTS

| 56-07246 | 1/1981 | Japan | 369/45 |
|---|---|---|---|
| 56-61044 | 5/1981 | Japan | 369/45 |

*Primary Examiner*—Raymond F. Cardillo, Jr.
*Attorney, Agent, or Firm*—Parkhurst & Oliff

[57] ABSTRACT

A method and an apparatus for detecting a focussing error signal and a tracking error signal of an objective lens with respect to an information track of a video disc on which a reading light spot is focussed by the objective lens includes a detection prism having a reflection surface which is set substantially at a critical angle and a light detector for receiving the light flux reflected by the reflection surface. The light detector is arranged in a far field of the track and having four light receiving regions divided along two orthogonal directions. The focusing error signal is derived as a difference between output signals from the regions aligned in a track direction and the tracking error signal is derived as a difference between output signals from the regions aligned in a direction perpendicular to the track direction. An information signal is obtained as a sum of the output signals from the four regions.

32 Claims, 21 Drawing Figures

FIG._1
PRIOR ART
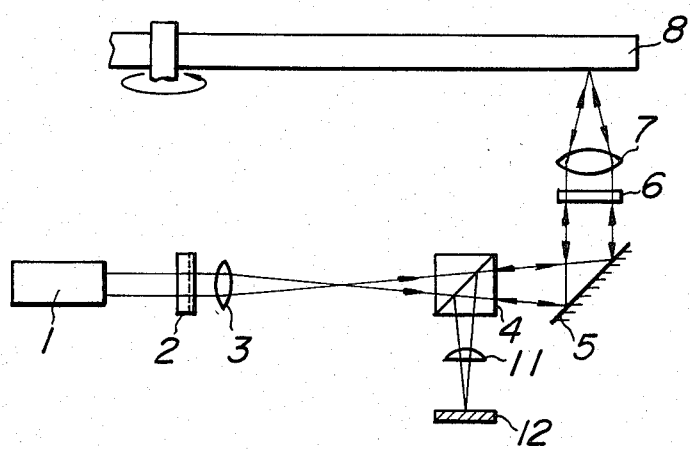
FIG._2
PRIOR ART
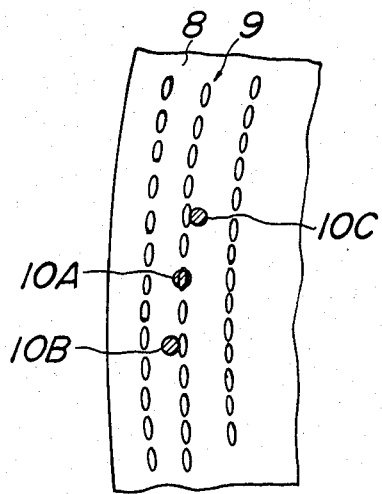
FIG._3
PRIOR ART
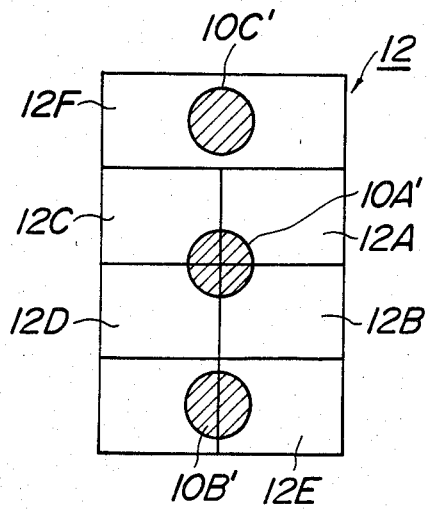

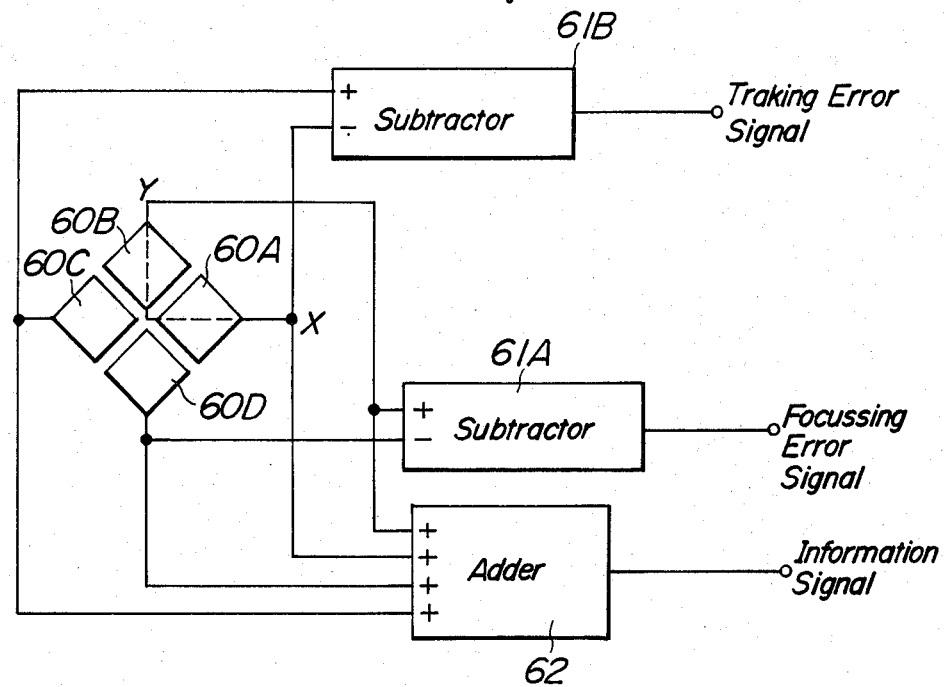
FIG._14
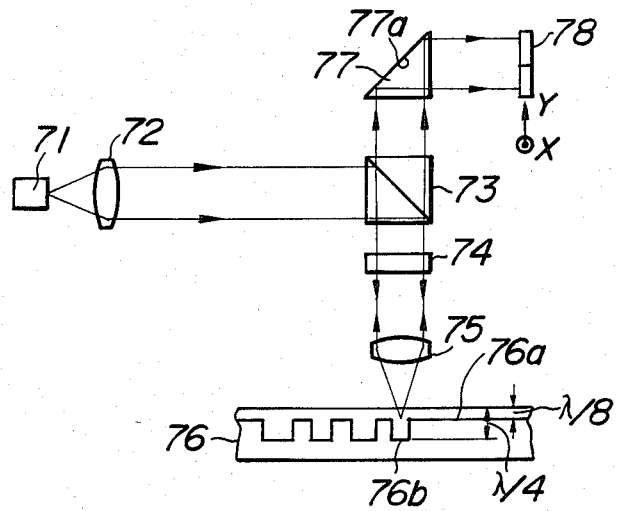
FIG._15

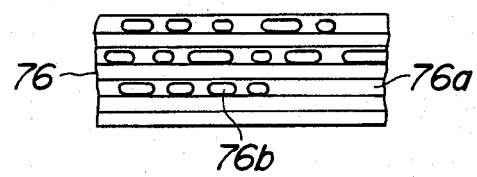
FIG_16
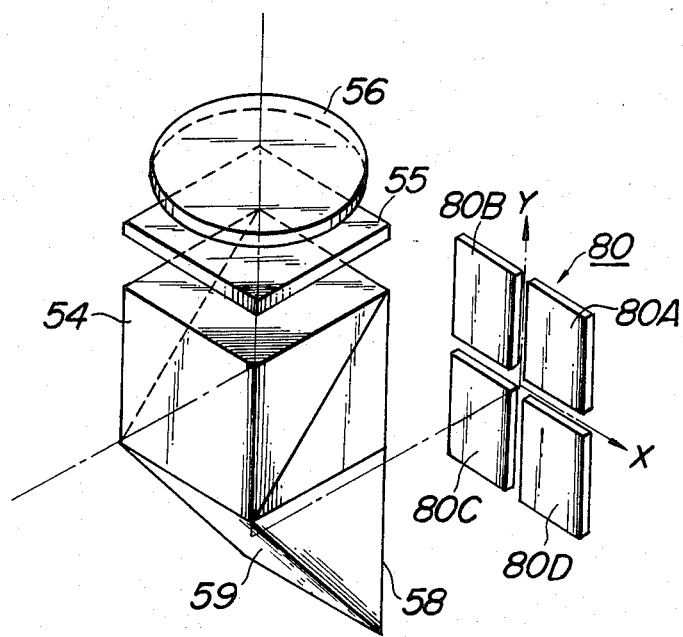
FIG_17

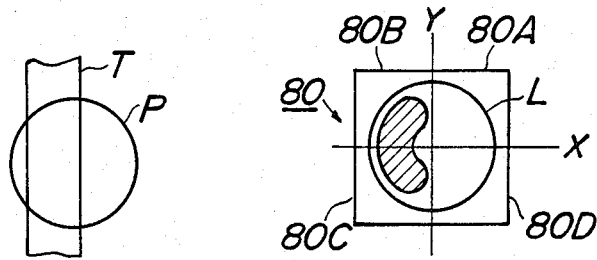
FIG._18
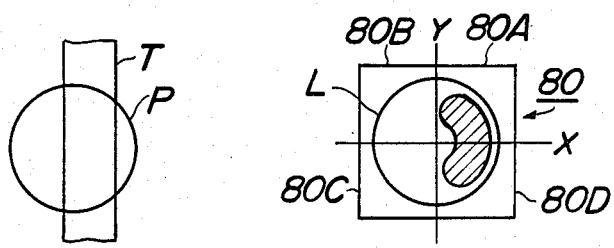
FIG._19
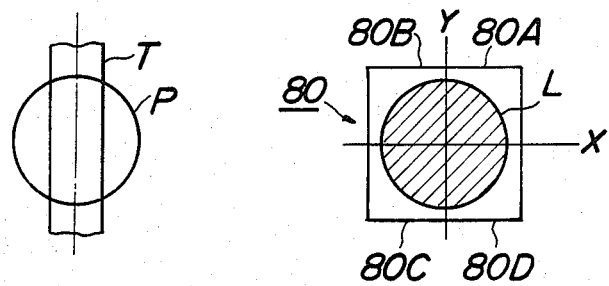
FIG._20

METHOD AND APPARATUS FOR DETECTING FOCUSSING AND TRACKING ERROR SIGNALS

BACKGROUND OF THE INVENTION

The present invention relates to a method for detecting a focussing error and a tracking error of an objective lens with respect to an object on which a light spot has to be focussed by said objective lens and to an apparatus for carrying out such a detecting method.

Such detecting method and apparatus are advantageously used in an apparatus in which a scanning light spot is projected by an objective lens onto one or more information tracks recorded spirally or concentrically on a disc-shaped record medium to read information recorded along the track.

In an embodiment of the apparatus for reproducing or picking-up information from the above mentioned record medium, the record medium is known as a video disc in which encoded video and audio signals are recorded as optical information such as optical transmittivity, reflection and phase properties. While the video disc is rotated at a high speed, such as thirty revolutions per second, i.e. 1,800 rpm, a laser beam emitted from a laser light source such as a helium-neon gas laser is focussed on the track of the disc as a light spot and the optical information is read out therefrom. One of the important properties of such a record medium is having a very high density of recorded information and thus a width of the information track that is very narrow and a narrow space between successive tracks of recorded information. In a typical video disc, the pitch of the tracks amounts only to 2 μm. Therefore, the diameter of the light spot should be correspondingly small. In order to pick-up correctly the recorded information from tracks having very narrow width and pitch, an error in a distance between the objective lens and the tracks, i.e. focussing error should be reduced as little as possible to make a spot diameter as small as possible.

To this end, the invention relates to apparatus which provides a focussing control system in which the amount and the direction of a de-focussed condition of the objective lens with respect to the disc surface are detected to produce a focussing error signal and the objective lens is moved in a direction of the optical axis of the objective lens in accordance with the detected focussing error signal.

Furthermore, during the reproduction, the light spot should follow the track precisely. For this purpose, the reproducing apparatus is also provided with a tracking control system in which an error in a position of the light spot with respect to the track, i.e. a tracking error is detected to produce a tracking error signal and the light spot is moved in a direction perpendicular to the track, i.e. a radial direction of the disc in accordance with the detected tracking error signal.

FIG. 1 is a schematic view illustrating a known focussing and tracking error detection system used in an optical pick-up apparatus. In this system, a tracking error and a focussing error are detected with the aid of a combination of a three-beam method and an astigmatism method. For this purpose, a laser light beam emitted from a laser light source 1 is divided by a diffraction grating 2 into three beams. These beams are transmitted by means of a lens 3, a beam splitting polarizing prism 4, a reflection surface 5 and a quarter-wavelength plate 6 into an objective lens 7. The three beams are focussed by the objective lens 7 as three light spots onto a disc 8 having one or more information tracks of crenellated pit construction.

FIG. 2 is a plan view showing a mutual relation between the three spots 10A, 10B and 10C and the track 9 formed in the disc 8. The spot 10A is situated at a center of the track 9 and the spots 10B and 10C are positioned at opposite side edges of the track 9. The center spot 10A is used to pick-up the information signal and to detect the focussing error signal. The spots 10B and 10C are used to detect the tracking error signal. The light beams reflected by the disc 8 are collected by objective lens 7 and made incident upon a light detector 12 by means of a quarter-wavelength plate 6, a mirror 5, a polarizing prism 4 and a cylindrical lens 11. Since the cylindrical lens 11 has a refraction power only in direction, the shape of the spot of the light beam corresponding to the center beam spot 10A is deformed with respect to the shape in an in-focussed condition in orthogonal directions, when the disc 8 moves up and down. As illustrated in FIG. 3, the light detector 12 comprises six light receiving regions 12A to 12F and four central regions 12A to 12D for receiving a central beam spot 10A' and two extreme regions for receiving two light beam spots 10B' and 10C', respectively, each beam spot 10B' and 10C' corresponding to the light spots 10B and 10C, respectively. Then, by suitably processing output signals from the regions 12A to 12D, it is possible to obtain the focussing error signal as well as the information signal. Further, the tracking error signal can be derived by producing a difference between output signals from the regions 12E and 12F.

In the known detection system so far explained with reference to FIGS. 1 to 3, three beams are produced by dividing the single laser beam emitted from the laser light source 1 by means of a grating 2. The light intensity of the respective beams is made small and thus, the gains of the detected signal are rather low. Further, since a relatively long optical path is required to focus the light beam after being reflected by the polarizing prism 4, there is a drawback that an optical system is liable to be large in size. Moreover, since the light detector 12 having the six regions must be arranged precisely in three axial directions, i.e. in the optical axis direction and in two orthogonal directions perpendicular to the optical axis, the adjustment in positioning the light detector is quite critical and requires time-consuming work. Furthermore, since a dynamic range in which the accurate focussing error signal can be obtained due to the deformation of the focussed beam spot 10A' is relatively small, any focussing error signal could not be produced if the disc 8 deviates from a given position even if only by a relatively small distance.

FIG. 4 is a schematic view showing another embodiment of the known focussing error and tracking error detection system disclosed in Japanese Patent Application Laid-open Publication No. 93,222/77. In this system, use is made of a single light beam, and a tracking error signal is obtained by detecting a variation in light distribution due to the interference of light diffracted by pits constituting the information track. A laser light beam emitted from a laser light source 21 is made incident upon a disc 26 having the information tracks by means of a lens 22, a half mirror 23, a reflection mirror 24 and an objective lens 25. The light beam reflected by the disc 26 is made incident upon a light detector 27 by means of the objective lens 25, the mirror 24 and the half mirror 23.

FIG. 5 is a signal processing circuit of the detection system shown in FIG. 4. As illustrated in FIG. 5, the light detector 27 comprises four light receiving regions 27A to 27D divided in a direction in which an image of the information track extends, i.e. a track direction Y and in a direction X perpendicular to the track direction Y and these regions are arranged in a plane of an exit pupil or an image plane of an exit pupil of the objective lens 25. Output signals from the diagonal regions 27A, 27C and 27B, 27D are summed in adders 28A and 28B, respectively. Then an information signal is derived from an adder 28C which forms a sum of the outputs from four regions 27A to 27D. A difference between the outputs signals from the adders 28A and 28B is derived by a subtractor 29 and the difference thus detected is multiplied in a multiplier 31 with an output signal from a phase shifter 30 which receives the information signal. Then an output signal from the multiplier 31 is transmitted through a low pass filter 32 to obtain a tracking error signal.

In the detection system shown in FIGS. 4 and 5, only the information signal and the tracking error signal can be derived from the single light beam. The focussing error signal has to be detected by separate light detecting means which receives a divided light beam and thus, the whole construction of the system is liable to be complicated and the signal gains might be decreased.

From Japanese Patent Application Laid-open Publication No. 93,223/77, it is known to derive from a single light beam, the tracking error signal, focussing error signal and information signal with the aid of the same principle as that of the detection system illustrated in FIG. 4. However, in this known system a light detector having a triangular shape has to be positioned at an end of an exit pupil of an objective lens and thus, a light beam could not be utilized efficiently and only a low signal to noise ratio can be obtained.

The applicant has proposed a method and apparatus which can detect a focussing error of an objective lens with respect to an object onto which a light spot is to be focussed as a light spot. According to this method, the optical system can be made small in size, the light detector can be easily arranged without need of precise adjustment and the focussing error can be detected very precisely. Such a method and an apparatus are described in the applicant's Japanese Patent Application No. 79,943/79 filed on June 25, 1979, laid open on Jan. 24, 1981, corresponding to U.S. patent application Ser. No. 195,075 filed on Oct. 8, 1980, as a CIP of U.S. patent application Ser. No. 161,428 filed on June 20, 1980, now U.S. Pat. No. 4,390,781.

FIG. 6 is a schematic view illustrating an optical pick-up apparatus comprising the above mentioned focus detection apparatus proposed by the applicant. In this apparatus, a linearly polarized light beam emitted from a laser light source 41 is collimated into a parallel light beam by a collimator lens 42 and passed through a polarizing prism 43 and a quarter-wavelength plate 44. Then, the parallel light beam impinges upon an objective lens 45 and is focussed on an information track of a disc 46 as a small light spot. The light beam reflected by the disc 46 is optically modulated in accordance with information recorded in the track and is reflected by the polarizing prism 43. The light flux reflected by the polarization prism 43 impinges upon a detection prism 47 having a reflection surface 48 and the light flux reflected by this surface 48 is received by a light detector 49. The reflection surface 48 is so arranged with respect to the incident light that under an in-focussed condition it makes a given angle with respect to the incident light (parallel light flux) which angle is equal to a critical angle or slightly smaller or greater than the critical angle. Now, for the time being, it is assumed that the reflection surface 48 is set at the critical angle. In the in-focused condition, the whole light flux reflected by the polarizing prism 43 is totally reflected by the reflection surface 48. In practice, a small amount of light is transmitted into a direction n shown in FIG. 6 due to incompleteness of a surface condition of the reflection surface 48. However, such a small amount of transmitted light may be ignored. If the disc 46 deviates from the in-focussed condition in a direction a in FIG. 6 and a distance between the objective lens 45 and the disc 46 is shortened, the light reflected by the polarizing prism 43 is no longer the parallel beam, but changes into a diverging light beam including extreme light rays $ai_1$ and $ai_2$. On the contrary, if the disc 46 deviates in the opposite direction b, the parallel light beam is changed into a converging light beam including extreme light rays $bi_1$ and $bi_2$. As can be seen in FIG. 6, light rays from an incident optical axis $OP_i$ to the extreme light ray $ai_1$ have incident angles smaller than the critical angle and thus, are transmitted through the reflection surface 48 at least partially as illustrated by $at_1$ (the reflected light being shown by $ar_1$). Contrary to this, light rays between the optical axis $OP_i$ and the extreme light ray $ai_2$ have incident angles larger than the critical angle and thus are totally reflected by the surface 48 as shown by $ar_2$. In case of deviation of the disc 46 in the direction b, the above relation becomes inversed, and light rays below a plane which includes the incident optical axis $OP_i$ and is perpendicular to the plane of the drawing of FIG. 6, i.e. a plane of incidence, are totally reflected by the reflection surface 48 as denoted by $br_1$, and light rays above said plane are at least partially transmitted through the reflection surface 48 as depicted by $bt_2$. As explained above, if the disc 46 deviates from the in-focussed position, the incident angles of the light rays impinging upon the reflection surface 48 vary in a continuous manner about the critical angle except for the center light ray passing along the optical axis $OP_i$. Therefore, when the disc 46 deviates from the in-focussed position either in the direction a or b, the intensity of the light reflected by the reflection surface 48 varies abruptly near the critical angle in accordance with the above mentioned variation in the incident angles as illustrated in FIG. 7. In this case, senses of the variations of the light intensities on both sides of said plane perpendicular to the incident plane and including the incident optical axis $OP_i$ vary in a mutually opposite manner. On the contrary, in the in-focussed condition, the light flux impinging upon the detection prism 47 is totally reflected by the reflection surface 48 and thus, the uniform light flux impinges upon the light detector 49. The light detector 49 is so constructed that the lower and upper light fluxes with respect to said plane are separately received by separate regions 49A and 49B, respectively. That is to say, the light detector 49 is divided along a plane which is perpendicular to the incident plane and includes an optical axis $OP_r$ of reflected light.

FIG. 7 shows a graph representing a variation of an intensity of reflected light in accordance with an incident angle near the critical angle. Curves $R_p$ and $R_s$ indicate the light intensities for P and S polarized light rays, respectively, P-polarized light and S-polarized light being defined with respect to an incident plane which contains a normal to an optical surface and a propagating direction of the light, wheren P-polarized light refers to an electric vector of polarized light vibrating in the incident plane and S-polarized light refers to an electric vector vibrating perpendicular to the incident plane. The curves are obtained when the detection prism 47 is made of material having a refractive index of 1.50. It should be noted that an intensity of a non-polarized light ray is equal to an intermediate value of $(R_p+R_2)/2$.

In FIG. 6, if the disc 46 deviates in the direction a, the light rays of the lower half of the incident light flux have incident angles smaller than the critical angle. Therefore, at least a part of the lower half light flux is transmitted through the reflection surface 48 and the amount of light impinging upon the light receiving region 49A is decreased. The upper half of the incident light flux has the incident angles larger than the critical angle and thus, is totally reflected by the surface 48. Therefore, the amount of light impinging upon the light receiving region 49B is not changed. On the contrary, if the disc 46 deviates in the direction b, the amount of light impinging upon the region 49B is decreased, but the amount of light impinging upon the region 49A is not changed. In this manner, the output signals from the regions 49A and 49B vary in an opposite manner. Therefore, a focussing error signal can be obtained by detecting a difference in output signals from the regions 49A and 49B and an information signal can be obtained by combining these output signals forming a sum signal.

The reflection surface 48 may be set at an angle slightly smaller than the critical angle. In such a case when the disc 46 deviates in the direction a, the amount of light impinging upon the region 49B is first increased and then becomes constant and the amount of light impinging upon the region 49A is decreased abruptly. Whereas, if the disc 46 deviates in the direction b, the amount of light impinging upon the region 49A is first increased and then becomes constant, while the amount of light impinging upon the region 49B is decreased abruptly.

In this manner by detecting a difference in output signals from the light receiving regions 49A and 49B, it is possible to obtain the focussing error signal having an amplitude which is proportional to an amount of the deviation from the in-focussed condition and a polarity which represents a direction of the deviation with respect to the in-focussed condition. The focussing error signal thus obtained is used to effect a focussing control for driving the objective lens 45 in the direction of its optical axis. Further, it is possible to derive the information signal corresponding to the pit information recorded in the information track as the sum signal of the output signals from the regions 49A and 49B. Further, in the in-focussed condition, since the light is scarcely transmitted through the reflection surface 48, a loss of light is very small and in the defocussed condition half of light flux with respect to the central light ray is totally reflected, but when the other half of light flux reflected by the surface 48 is decreased to a great extent, the difference in the amount of light impinging upon the regions 49A and 49B becomes great. Therefore, a very accurate focus detection can be effected with a very high sensitivity.

For instance, when use is made of an objective lens 45 having a numerical aperture NA=0.5 and a focal length f=3 mm and of a detection prism 47 having a refractive index n=1.50 and the disc 46 deviates by about 1 μm, a variation of an incident angle for the extreme right ray which is subjected to the largest variation in incident angle about 0.015° which causes a sufficiently large variation in light amount impinging upon the detector regions 49A and 49B.

In case of reading the information from the information record medium, such as a video disc, it is necessary to effect the focussing control as described above so that the light spot can be always focussed on the information record surface. It is also necessary to effect the tracking control so that the light spot can always follow a predetermined information track without deviating therefrom. In order to effect the tracking control, a tracking error signal has to be detected. However, in the above mentioned known system it is necessary to provide separate means for deriving the tracking error signal from the light reflected from the disc. Therefore, the optical system might become more complicated and the number of optical elements might be increased.

SUMMARY OF THE INVENTION

The present invention has for its object to provide a method and an apparatus for detecting a focussing error and a tracking error of an objective lens with respect to an object onto which a light spot is to be focussed by means of the objective lens, which method and apparatus can retain the above mentioned advantages of the detection system based on the total reflection at the critical angle and can detect a focussing error signal and a tracking error signal at a very high sensitivity.

It is still another object of the invention to provide a method and an apparatus for detecting a focussing error signal and a tracking error signal by means of a single light detector which receives a single light beam.

It is still another object of the invention to provide a method and an apparatus for detecting simultaneously a focussing error signal, a tracking error signal and an information signal by means of a single light detector receiving a single light beam.

It is still another object of the invention to provide a method and an apparatus for detecting a focussing error signal and a tracking error signal by means of the small number of optical elements.

According to the invention a method for detecting a focussing error signal and a tracking error signal of an objective lens with respect to at least one track of a record medium onto which a spot of a light beam is to be formed by means of said objective lens, said track being constituted by crenellated pit construction having a depth other than integer multiple of a quarter-wavelength of the light beam, comprising:

focussing the light beam emitted from a light source onto the record medium;

introducing at least a part of a light flux which is reflected from the record medium, into an optical member including an optical surface which reflects and/or refracts the incident light flux, said optical member being made of material which has a higher refractive index than that of material into which said light flux enters after being refracted by and transmitted through said optical surface;

detecting at least a part of the light flux reflected by said optical surface by means of a light detector which is arranged in a far field of the track and comprises four divided light receiving regions arranged about an optical axis of the incident light flux; and deriving the focussing error signal and the tracking error signal by processing output signals from the light receiving regions.

According to the invention an apparatus for detecting a focussing error signal and a tracking error signal of an objective lens with respect to at least one track of a record medium onto which a spot of a light beam emitted from a light source is to be focussed by means of said objective lens, said track being constituted by crenellated pit construction having a depth other than integer multiple of a quarter-wavelength of the light beam which comprises:

a beam splitting element arranged between the light source and the objective lens for directing the light beam emitted from the light source to the objective lens and directing a light flux reflected by the record medium into a direction different from that of the light source;

an optical member arranged to receive at least a part of the light flux reflected from said record medium and including an optical surface which reflects and/or refracts said light flux, said optical member being made of material which has a higher refractive index than that of material into which the light flux enters after being refracted by and transmitted through said optical surface;

light detecting means arranged in a far field of the track to receive the light flux reflected by said optical surface and having four light receiving regions which are arranged about an optical axis of the incident light flux and are divided in two substantially orthogonal directions; and a circuit for receiving and processing output signals from the light receiving regions to derive the focussing error signal and the tracking error signal.

BRIEF DESCRIPTION OF THE DRAWINGS

FIG. 1 is a schematic view showing an embodiment of a known optically reproducing apparatus;

FIG. 2 is a plan view illustrating a positional relation between three spots and tracks in the apparatus of FIG. 1;

FIG. 3 is a plan view depicting a construction of a light detector of the apparatus shown in FIG. 1;

FIG. 14 is a block diagram illustrating an embodiment of a signal processing circuit of the apparatus of FIG. 8;

FIG. 15 is a schematic view showing an optically recording apparatus including another embodiment of the detecting apparatus according to the invention;

FIG. 16 is a plan view showing a pregrooving disc used in the apparatus of FIG. 15;

FIG. 17 is a perspective view depicting another embodiment of the detecting apparatus according to the invention;

FIGS. 18, 19 and 20 are schematic diagrams for explaining the operation of the apparatus shown in FIG. 17.

DESCRIPTION OF THE PREFERRED EMBODIMENTS

Figure 4:
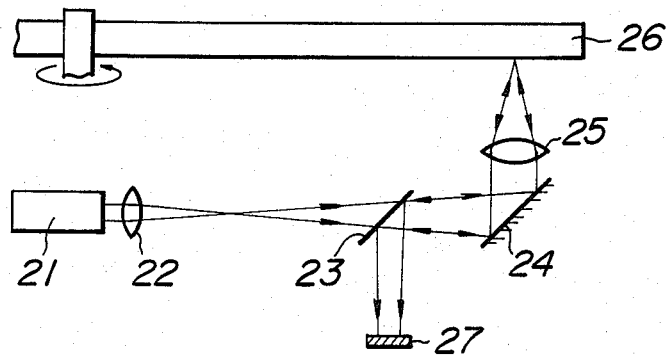
FIG. 4 is a schematic view showing another embodiment of the known optically reproducing apparatus.
Figure 5:
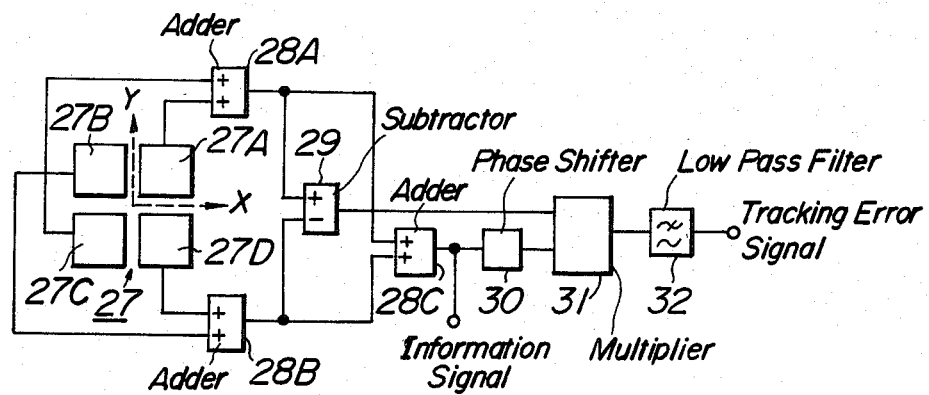
FIG. 5 is a block diagram illustrating a signal processing circuit of the apparatus shown in FIG. 4.
Figure 6:
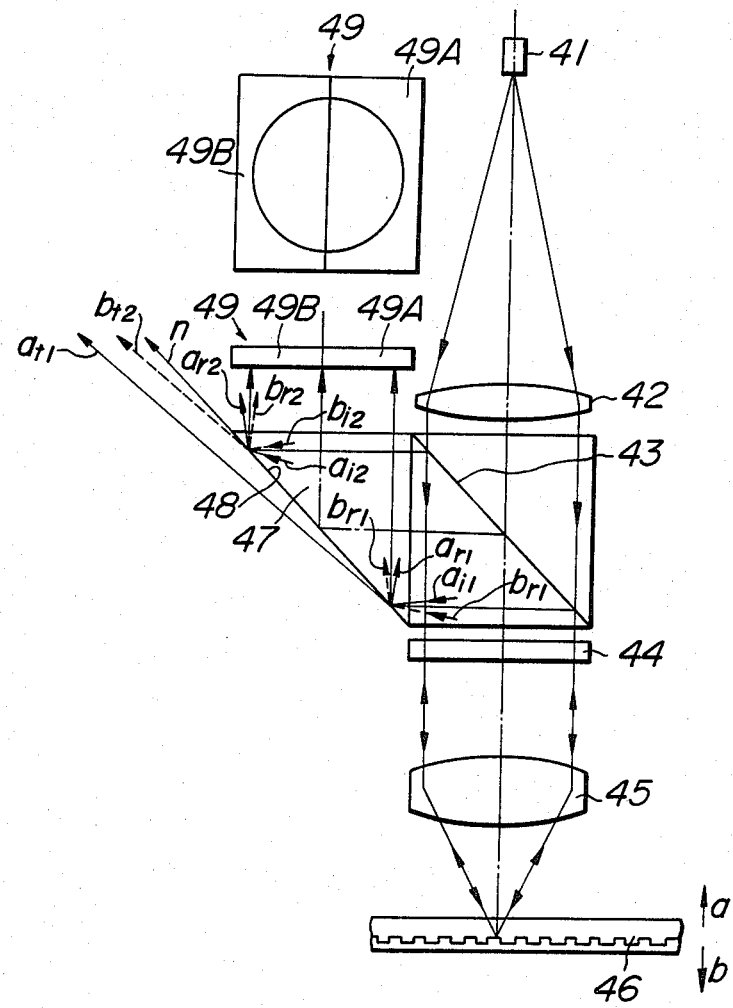
FIG. 6 is a schematic view showing still another embodiment of the known optically reproducing apparatus developed by the applicant.
Figure 7:
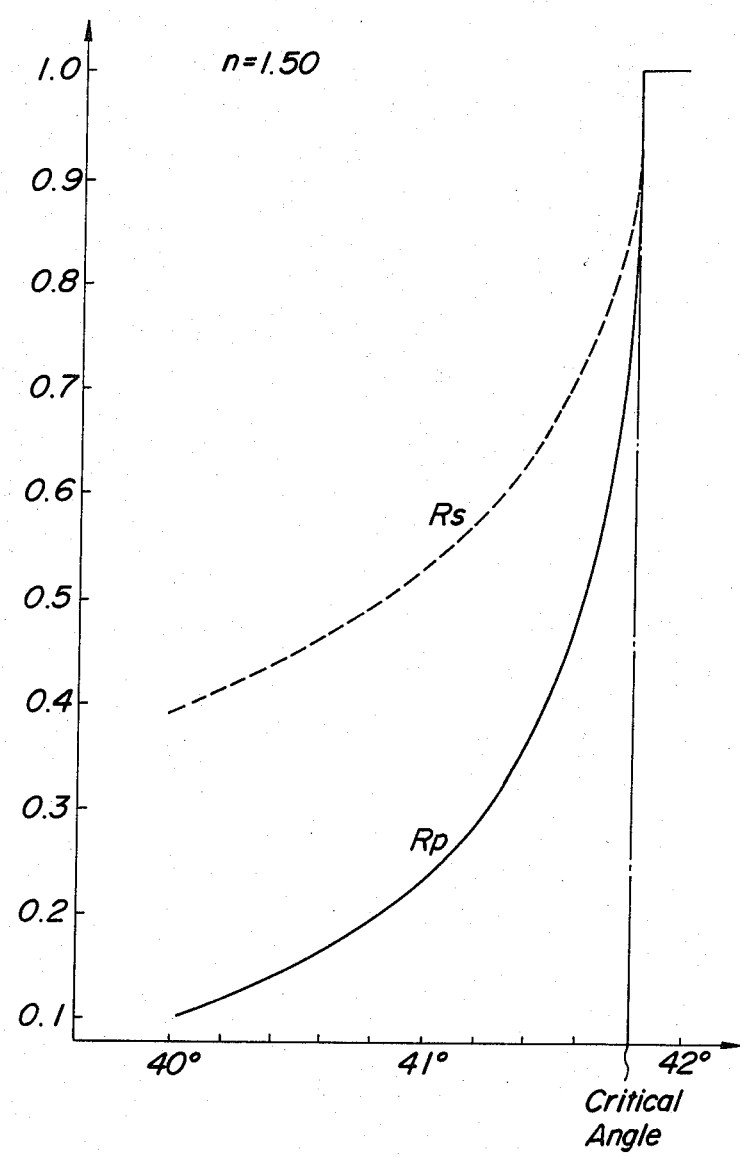
FIG. 7 is a graph for explaining the operation of the apparatus of FIG. 6.
Figure 8:
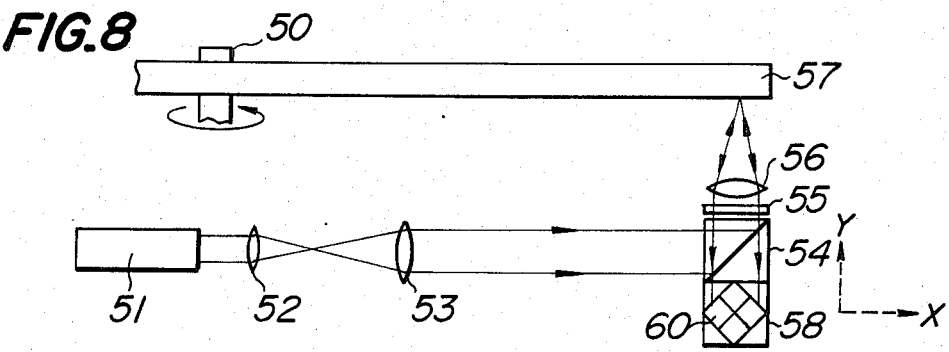
FIG. 8 is a schematic side view illustrating an optically reproducing apparatus comprising an embodiment of the detecting apparatus according to the invention.
Figure 9:
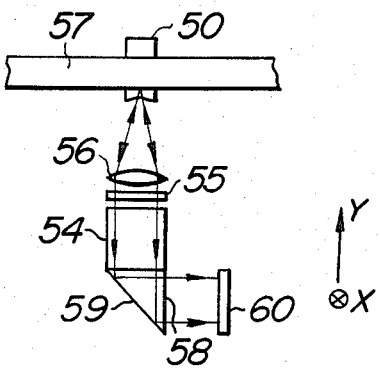
FIG. 9 is a schematic front view of the apparatus of FIG. 8.

FIGS. 8 and 9 are schematic views showing an embodiment of the detection apparatus according to the invention and FIG. 8 is a side view seen in a direction of a track and FIG. 9 is a side view seen in a direction perpendicular to the track direction. In other words, in FIG. 8 the track extends perpendicularly to the plane of the drawing, but in FIG. 9 the track is in parallel with the plane of the drawing. A light beam emitted from a laser light source 51 is converted by lenses 52 and 53 into a parallel light beam having a large diameter. The light beam is then focussed on a disc 57 having information tracks as a light spot by means of a polarizing prism 54, a quarter-wavelength plate 55 and an objective lens 56. The disc 57 is rotated together with a spindle 50 which rotates at a given speed. The light beam is reflected by the information track of a crenellated pit construction. According to the invention, a depth of the pit is determined to a value which is not equal to integer multiple of a quarter-wavelength of the laser light beam generated from the laser light source 51. The reflect light is collected by the objective lens 56 and is made incident upon a prism 58 via the quarter-wavelength plate 55 and the polarizing prism 54. The prism 58 comprises a reflection surface 59 which is set substantially at a critical angle with respect to an optical axis of the incident light beam as explained with reference to FIG. 6. According to the invention the prism 58 is so arranged that an incident plane to the reflection surface 59 is made in parallel with the direction of the information track. The light beam reflected by the reflection surface 59 is received by a light detector 60 which is arranged in a far field of the information track.

Figure 10:
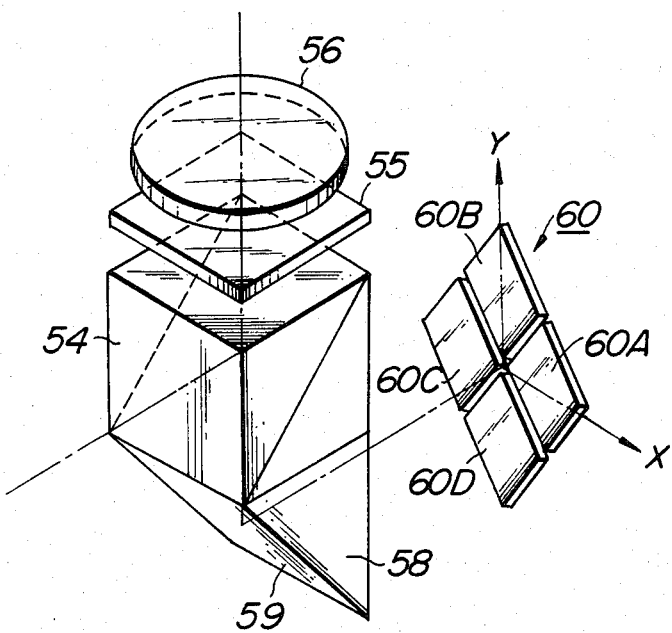
FIG. 10 is a perspective view showing an optical member and a light detector of the apparatus of FIG. 8.

FIG. 10 is a perspective view showing a part of the optical system including the objective lens 56, the quarter-wavelength plate 55, the polarizing prism 54, the prism 58 with the reflection surface 59 and the light detector 60. The light detector 60 comprises four light receiving regions 60A to 60D divided in orthogonal directions, one of which is inclined by 45° with respect to a direction X which is perpendicular to a direction Y of a track image projected onto the detector 60 and the other of which is inclined also by 45° with respect to the direction Y of the track image projected on the detector.

Figure 11:
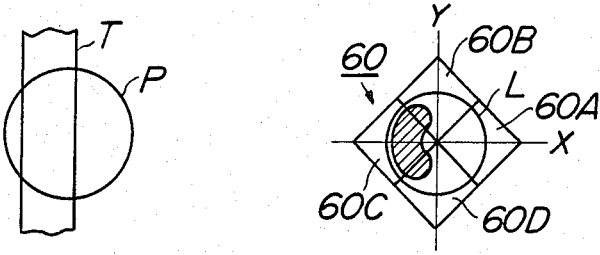
FIGS. 11, 12 and 13 are schematic diagrams for explaining the operation of the apparatus shown in FIG. 8.
Figure 12:
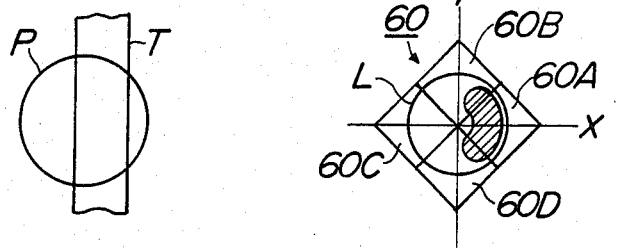
Figure 13:
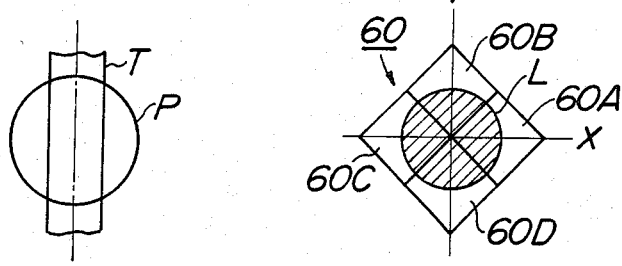

In this manner, a parallel light flux is made incident upon the objective lens 56 and the light detector 60 having four divided light receiving regions 60A to 60D is arranged in a far field which is sufficiently spaced from a plane of the information track image formed by the objective lens 56. Then, at a position near the exit pupil of the objective lens 56, a distribution of a light flux impinging upon the light detector 60 is made substantially identical with a light distribution at the plane of the exit pupil of lens 56. Further, since the pit depth of the information track is not equal to a quarter-wavelength of the light, a phase difference of the reflected light due to the pits is not equal to zero or $\pi$. Therefore, when the tracking error occurs, the reflected light flux has a variation in light distribution in the direction X as shown in FIGS. 11 to 13 and by processing output signals from the light receiving regions 60A to 60D as illustrated in FIG. 14, it is possible to obtain the tracking error signal, the focussing error signal and the information signal. That is to say, by detecting a difference between the output signals from the regions 60A and 60C, it is possible to obtain the tracking error signal. The information signal can be derived as a sum of the output signals from the four regions 60A to 60D. When the objective lens 56 is out of focus, a light distribution in the direction Y is changed with respect to the plane perpendicular to the incident plane of the reflection surface 59, i.e. with respect to the direction X due to the existence of the prism 58. Therefore, by detecting a difference between the output signals from the regions 60B and 60D, it is possible to obtain the focussing error signal representing an amount and a direction of the de-focussing condition. In this manner, the focussing error signal and the tracking error signal as well as the information signal can be derived simultaneously from the single light detector 60 receiving the single light beam.

FIG. 11 illustrates a case in which a light spot P deviates rightward with respect to a track T, i.e. a pit. In this case, a dark area denoted by hatching is produced in a light flux L projected onto the light detector 60 substantially at the light receiving region 60C. In FIG. 12, the light spot P deviates in the left hand side with respect to the track T and then a dark area in the light flux L is generated substantially at the region 60A. FIG. 13 shows the correct tracking condition in which the light spot P is projected at the center of the track T and in such a case a uniformly dark spot L is made incident upon the light detector 60.

Therefore, the tracking error signal can be derived by detecting the difference between the output signals from the regions 60A and 60C which are arranged in the direction X perpendicular to the track direction Y. In order to retain such a relation it is necessary that the phase difference of the light flux reflected by the track T is not equal to 0 or $\pi$ and to this end it is sufficient that the pit depth is not equal to integer multiple of a quarter-wavelength of the light.

FIG. 14 shows an embodiment of a circuit for generating the information signal, the tracking error signal and the focussing error signal. The output signals from the four light receiving regions 60A to 60D are supplied to an adder 62 to produce the information signal. The focussing error signal is derived from a subtractor 61A as a difference between the output signals from the regions 60B and 60D which are arranged in the track direction Y. The tracking error signal is derived by detecting by a subtractor 61B a difference between the output signals from the regions 60A and 60C arranged in the direction X perpendicular to the track direction Y.

FIG. 15 is a schematic view showing an optical information recording apparatus comprising the detection apparatus according to the invention. In this recording apparatus use is made of a pregrooving disc having one or more reference tracks previously recorded. Such a pregrooving disc has been known and is described in "IEEE Spectrum", August, 1979, pages 26 to 33. A laser beam emitted from a laser light source 71 and modulated in accordance with an information signal to be recorded is converted into a parallel light beam by a collimator lens 72 and the parallel light beam is projected onto a pregrooving disc 76 as a light spot by means of a polarizing prism 73, a quarter-wavelength plate 74 and an objective lens 75. The pregrooving disc comprises a reference track 76a having a depth equal to $\lambda/8$, where $\lambda$ is a wavelength of the laser light. Information pits to be formed have a depth equal to $\lambda/4$. The light beam reflected by the reference track 76a is collected by the objective lens 75 and is made incident upon a reflection surface 77a of a detection prism 77 by means of the quarter-wavelength plate 74 and the polarizing prism 73. By detecting the light flux reflected by the surface 77a by means of a light detector 78 having four divided light receiving regions as explained above with reference to FIG. 10, it is possible to derive a focussing error signal and a tracking error signal. Then a servo mechanism is driven by means of the thus detected focussing and tracking error signals so as to drive, for instance, the objective lens in such a manner that the beam spot having the minimum diameter is always positioned correctly on the reference track. In this manner, it is possible to form a series of pits 76b along the reference track 76a as shown in FIG. 16.

In the above embodiment, the depth of the reference track 76a is equal to $\lambda/8$ and the depth of the pits 76b is made equal to $\lambda/4$. According to the invention, these depths may be set to values other than $\lambda/8$ and $\lambda/4$, respectively as long as the following condition is satisfied. The depth of the reference track is $l_1$ which is not equal to multiple integer of $\lambda/4$ and the depth of the pits is $l_2$ which is not equal to multiple integer of $\lambda/2$, and $l_1$ and $l_2$ satisfy the following inequality for arbitrary integers m and n.

$$\left| \frac{n\lambda}{4} - l_1 \right| \neq \left| \frac{m\lambda}{4} - l_2 \right|$$

Figure 21:
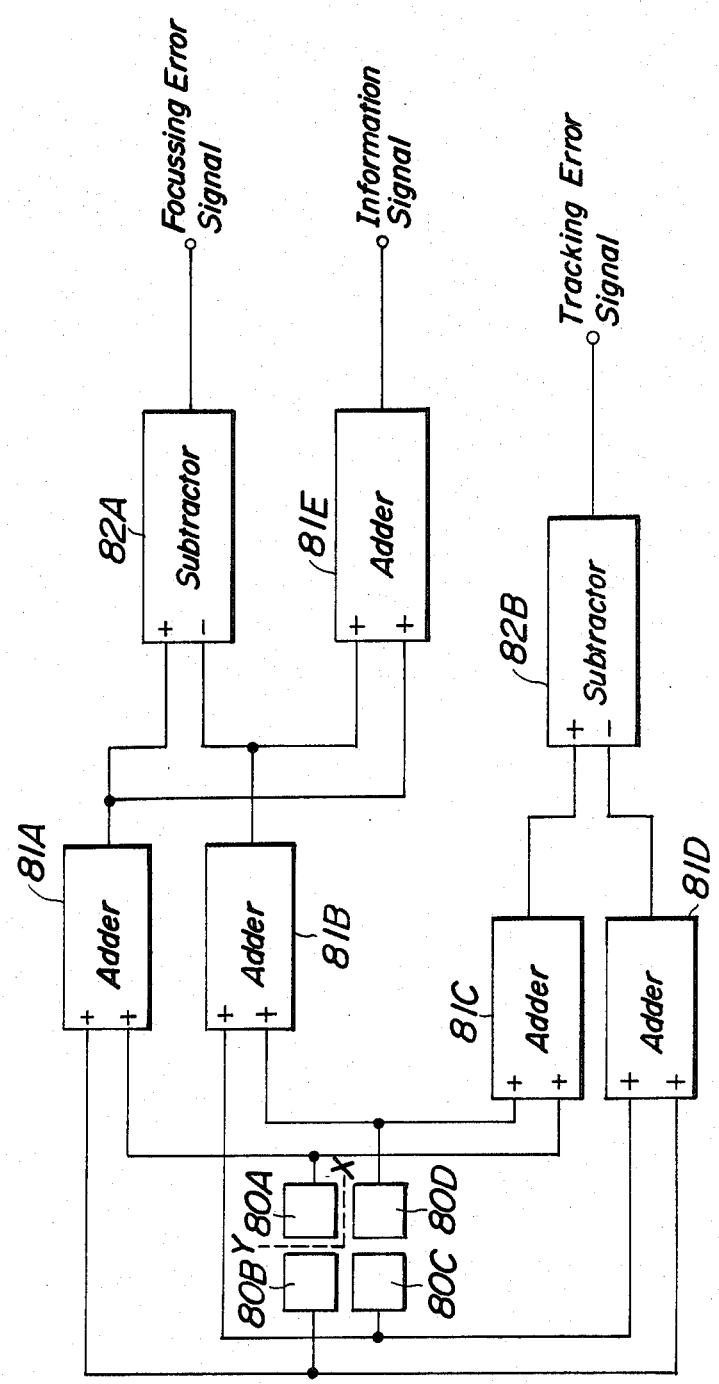
FIG. 21 is a block diagram showing one embodiment of the signal processing circuit of the apparatus shown in FIG. 17.

FIG. 17 is a perspective view showing another embodiment of the detection apparatus according to the invention. In the above embodiment FIG. 14, the light detector 60 is so arranged that the first and third light receiving regions 60A and 60C are aligned in the direction X perpendicular to the track direction Y and the second and fourth light receiving regions 60B and 60D are aligned in the track direction Y. In the other words, lines along which the regions are divided can be rotated about the optical axis by an angle of 45°. Contrary to this, in the FIG. 15 embodiment, a light detector 80 comprising four light receiving regions 80A to 80D is so arranged that lines dividing the regions coincide with the directions X and Y. That is to say, the regions 80A, 80B and 80C, 80D are divided in the track direction Y and the regions 80A, 80D and 80B, 80C are divided in the direction X perpendicular to the track direction Y. Then, the dark area in the light flux L impinging upon the light detector 80 varies as shown in FIGS. 18 to 20 in accordance with the deviation of the beam spot P with respect to the track T in the entirely similar manner as that shown in FIGS. 11 to 13. Therefore, the information signal, the focussing error signal and the tracking error signal can be derived by means of a circuit illustrated in FIG. 21. A first sum of output signals from the first and second regions 80A and 80B is formed by a first adder 81A, a second sum of output signals from the third and fourth regions 80C and 80D is produced by a second adder 81B, a third sum of output signals from the first and fourth regions 80A and 80D is derived from a third adder 81C, and a fourth sum of output signals from the second and third regions 80B and 80C is formed by a fourth adder 81D. Then the information signal is derived from a fifth adder 81E as a sum of the first and second sums, i.e. a sum of the output signals from the four regions 80A to 80D. The focussing error signal is produced by a first subtractor 82A which forms a difference between the first and second sums supplied from the first and second adders 81A and 81B, respectively. The tracking error signal is derived by a second subtractor 82B which derives a difference between the third and fourth sums supplied from the third and fourth adders 81C and 81D, respectively. In this manner, the information signal, the focussing error signal and the tracking error signal can be derived simultaneously by means of the single light detector 80 comprising the four light receiving regions 80A to 80D divided in the directions X and Y.

As explained above in detail, according to the present invention, the information signal, focussing and tracking error signals can be detected simultaneously by means of the single light detector without dividing the incident beam and reflected beam. Therefore, loss of a light amount can be made small and the necessary signals having a high gain can be obtained in a precise manner. Further, the detection apparatus can be made compact in construction and less expensive in cost. The number of the necessary optical elements can be decreased to a great extent. Moreover, since the light detector is arranged in the far field of the information track, the detector may be situated at an arbitrary position on the exit optical axis of the prism except for an image plane of the objective lens. Therefore, the light detector can be arranged in position without need of precise alignment. Further, since the optical length can be made short, the whole apparatus can be made small in size. Moreover, the focussing and tracking error signals can be derived by means of the simple circuit.

The present invention is not limited to the embodiments mentioned above, but may be modified in various manners. For instance, in the above embodiments use is made of the polarized light beam and the light beam dividing element is constituted by the polarizing prism. However, according to the invention use may be made of a non-polarized light beam and in this case a half mirror may be used. Further, the present invention may be effectively applied to such a device that a converging light flux is emitted from the objective lens.

What is claimed is:

1. A method for detecting a focussing error signal and a tracking error signal of an objective lens with respect to at least one track direction on a record medium onto which a spot of a light beam is formed by means of said objective lens, each track of said record medium being constituted by crenellated pit construction, having a depth other than an integer multiple of a quarter-wavelength of the light beam, comprising:

focussing the light beam emitted from a light source onto a record medium;

introducing at least a part of a light flux which is reflected from the record medium into an optical member including an optical surface which reflects and/or refracts the incident light flux, said optical member being made of material which has a higher refractive index than that of material into which said light flux enters after being refracted by and transmitted through said optical surface;

detecting at least a part of the light flux reflected by said optical surface by means of a light detector which is arranged in a far field of the track and comprises four divided light receiving regions arranged about an optical axis of the incident light flux; and deriving the focussing error signal by detecting a difference between the output signals supplied from two light receiving regions aligned in said track direction and deriving the tracking error signal by determining the difference between the output signals from the two light receiving regions aligned in a direction perpendicular to said track direction.

2. A method according to claim 1, wherein said optical surface is so set that a central light ray of said light flux, when said objective lens is in an in-focussed condition, is made incident upon the optical surface at an angle which is substantially equal to a critical angle, which is the angle which the optical axis of said objective lens makes with said optical surface.

3. A method according to claim 2, wherein said light detector is so arranged with respect to the optical surface that the four light receiving regions are divided into two orthogonal directions, one direction is inclined with respect to a track direction by substantially 45° and the other direction is inclined by substantially 45° with respect to a direction perpendicular to the track direction.

4. A method according to claim 1, wherein said light detector is so arranged with respect to the optical surface that the four light receiving regions are divided in two orthogonal directions, one direction is inclined with respect to a track direction by substantially 45° and the other direction is inclined by substantially 45° with respect to a direction perpendicular to the track direction.

5. A method according to claim 1, wherein the light flux reflected by the record medium is directed to a direction different from that to the light source by means of a beam splitting member.

6. A method according to claim 5, wherein the light beam is a polarized beam and said beam splitting member is a polarizing prism.

7. A method according to claim 6, wherein the incident light flux passing along the optical surface is polarized.

8. A method according to claim 1, wherein a first of at least one of said information tracks has an information signal recorded along the track and said information signal is derived by determining the sum of the output signals from the four light receiving regions.

9. A method according to claim 8, wherein a second of at least one of said information tracks has an information signal recorded along the track and said information signal is derived by determining the sum of the output signals from the four light receiving regions.

10. An apparatus for detecting a focussing error signal and a tracking error signal of an objective lens with respect to at least one track of a record medium onto which a spot of a light beam emitted from a light source is focussed by means of said objective lens, each track of said record medium being constituted by crenellated pit construction having a depth other than an integer multiple of a quarter-wavelength of the light beam comprising:

a beam splitting element arranged between the light source and the objective lens for directing the light beam emitted from the light source to the objective lens and directing a light flux reflected by the record medium into a direction different from that to the light source;

an optical member arranged to receive at least a part of the light flux reflected from said record medium and including an optical surface which reflects and/or refracts said light flux, said optical member being made of material which has a higher refractive index than that of material into which the light flux enters after being refracted by and transmitted through said optical surface;

light detecting means arranged in a far field of the track to receive the light flux reflected by said optical surface and having four light receiving regions which are arranged about an optical axis of the incident light flux and are divided in two substantially orthogonal directions; and a circuit for receiving and processing output signals from the light receiving regions to derive the focussing error signal and the tracking error signal comprising a first subtractor for detecting a difference between output signals from first and third light receiving regions aligned in a direction perpendicular to said track direction, and a second subtractor for detecting a difference between output signals from second and fourth light receiving regions aligned in said track direction to derive said tracking error signal.

11. An apparatus according to claim 10, wherein said optical member consisting of a prism.

12. An apparatus according to claim 11, wherein said light detector is so arranged with respect to the optical surface that said orthogonal directions are inclined by substantially 45° with respect to a track direction and a direction perpendicular to the track direction.

13. An apparatus according to claim 10, wherein said beam splitting element is constituted by a polarizing prism and a polarized light flux impinges upon the optical surface.

14. An apparatus according to claim 13, further comprising a quarter-wavelength plate arranged between the polarizing prism and the objective lens.

15. An apparatus according to claim 14, wherein said light detector is so arranged with respect to the optical surface that said orthogonal directions are inclined by substantially 45° with respect to a track direction and a direction perpendicular to the track direction.

16. An apparatus according to claim 13, wherein the polarized light flux is a P-polarized light flux.

17. An apparatus according to claim 16, wherein said light detector is so arranged with respect to the optical surface that said orthogonal directions are inclined by substantially 45° with respect to a track direction and a direction perpendicular to the track direction.

18. An apparatus according to claim 13, wherein said light detector is so arranged with respect to the optical surface that said orthogonal directions are inclined by substantially 45° with respect to a track direction and a direction perpendicular to the track direction.

19. An apparatus according to claim 10, further comprising a lens system arranged between the light source and the objective lens to introduce the light beam to the objective lens as a parallel light flux.

20. An apparatus according to claim 19, wherein said light detector is so arranged with respect to the optical surface that said orthogonal directions are inclined by substantially 45° with respect to a track direction and a direction perpendicular to the track direction.

21. An apparatus according to claim 10, wherein the optical member is so arranged that the optical surface makes with respect to a central light ray of the incident light flux an angle which is substantially equal to a critical angle which is the angle which the optical axis of said objective lens makes with said optical surface.

22. An apparatus according to claim 21, wherein said light detector is so arranged with respect to the optical surface that said orthogonal directions are inclined by substantially 45° with respect to a track direction and a direction perpendicular to the track direction.

23. An apparatus according to claim 10, wherein said light detector is so arranged with respect to the optical surface that said orthogonal directions are inclined by substantially 45° with respect to a track direction and a direction perpendicular to the track direction.

24. An apparatus according to claim 23, wherein said record medium has an information signal recorded along the track and said circuit further comprises an adder for forming a sum of the output signals from the four light receiving regions to derive the information signal.

25. A method for detecting a focussing error signal and a tracking error signal with respect to a single light beam on a record medium adapted to contain tracks of information thereon and adapted to be moved relative to said light beam, comprising the steps of:

focussing said light beam emitted from a light source onto a record medium utilizing means for focussing;

introducing at least part of the light which is reflected from a record medium into means for reflecting, said reflecting means comprises surface means for reflecting incident light positioned wherein an incident plane to the surface means for reflecting incident light is substantially parallel with said direction of the tracks of information on said record medium and substantially at a critical angle which is the angle which the optical axis of said means for focussing makes with said optical surface means;

detecting at least part of the light reflected by said reflecting means utilizing means for detecting light, said detecting means being positioned so as to be illuminated by light reflected from said surface means substantially at said critical angle of reflection, said detecting means comprising at least four detectors positioned relative to a central point in surrounding fashion, each of said at least four light detectors arranged in a plane perpendicular to a light ray passing through the optical axis of said means for focussing, the configuration of said detectors within said plane being substantially rectangular and said detectors arranged orthogonally such that each detector in said pair of detectors is diagonally opposite the other detector, and said light detectors operate to produce an electric current in response to being illuminated, said detecting means and said surface means being so positioned such that when said focussing means is optimally focussed and when said light beam illuminates a predetermined portion of a medium as it tracks a medium said detecting means is illuminated in a predetermined fashion;

deriving the focussing error signal and a tracking error signal utilizing means for processing, said processing means includes adder means for adding electrical signals and means forming electrical circuitry, said adder means being electrically connected to each of said detectors so as to have an output indicative of a composite signal of all of said at least four detectors so as to produce an information signal, said processing means further comprising first and second substractor means for determining the difference between two signals, each of said subtractor means being electrically connected by said circuitry means to a pair of detectors positioned on opposite sides of said central point, said first subtractor means being operative to detect a tracking error signal indicative of the position of said light beam relative to a medium and said second subtractor being operative to detect a focussing error signal indicative of the focussing condition of said light beam on a medium.

26. The method of claim 25 wherein said light beam illuminates a record medium comprising a rotating disc having substantially circular tracks formed by a crenellated pit construction.

27. The method of claim 25, wherein there are four detectors arranged in a plane perpendicular to a light ray passing through the optical axis of said focussing means, the configuration of said detectors within said plane being substantially rectangular and said detectors are arranged orthogonally such that each detector in said pair of detectors is diagonally opposite the other detector.

28. An apparatus for detecting a focussing error signal and a tracking error signal of a focussing means with respect to a moving record medium onto which a light beam is projected comprising:

means for projecting a light beam;

means for focussing said light beam onto a predetermined track on a moving record medium, said focussing means being capable of being adjusted to an optimal focussing condition such that said light beam is converged to a predetermined degree onto a record medium;

means for detecting light comprising at least four detectors positioned relative to a central point in surrounding fashion and circuitry means for electrical connection, each of said detectors being capable of emitting an electrical signal in response to being illuminated;

said light detectors being arranged in a plane perpendicular to a light ray passing through the optical axis of said means for focussing, the configuration of said detectors within said plane being substantially rectangular and said detectors being arranged orthogonally such that each detector in said pair of detectors is diagonally opposite the other detector;

means for reflecting light positioned so as to receive at least a portion of said light beam after reflection from a record medium, said reflecting means having means forming a surface positioned wherein an incident plane to the surface means for reflecting incident light is substantially parallel with the direction of said tracks of information on said record medium and substantially at a critical angle which is the angle which the optical axis of said focussing means makes with said optical surface means such that when said focussing means is positioned at said optimal position said surface means reflects light into said detecting means in a predetermined manner and when said focussing means is not in said optimal position, light is not received by said first detecting means in said predetermined manner;

means for deriving a tracking error signal and a focussing error signal;

said deriving means comprising adder means for adding electrical signals, said adder means being electrically connected to each of said at least four detectors by said circuitry means, said deriving means further comprising first and second subtractor means, each of said subtractor means being electrically connected by said circuitry means to a pair of said detectors positioned on opposite sides of said central point, said first subtractor means being operative to detect a tracking error signal indicative of the position of said light beam relative to a record medium and said second subtractor being operative to detect a focussing error signal indicative of the focussing condition of said focussing means;

whereby utilizing a single light beam, the focussing error and tracking error signals may be formulated by said deriving means based upon the illumination of said at least four detectors and signals derived by said subtractor means.

29. The apparatus of claim 28 wherein there are four detectors arranged in a plane perpendicular to a light ray passing through the optical axis of said focussing means, the configuration of each of said detectors with said plane being rectangular and said detectors are arranged so as to form orthogonal axes such that said central point is the central point for the orthogonal axes and each detector within said pair of detectors is diagonally opposite the other detector in said pair.

30. The apparatus of claim 29, wherein said light beam illuminates a record medium comprising a rotating disk having substantially circular tracks formed by a crenellated pit construction.

31. The apparatus of claim 28 wherein said light beam illuminates a record medium comprising a rotating disc having substantially circular tracks formed by a crenellated pit construction.

32. The apparatus of claim 31 wherein an information signal is obtained by said adder means.

* * * * *